United States Patent [19]

Weiss et al.

[11] Patent Number: 5,180,642

[45] Date of Patent: Jan. 19, 1993

[54] ELECTROCHEMICAL CELLS WITH END-OF-SERVICE INDICATOR

[75] Inventors: Douglas J. Weiss, Plymouth; John W. Cretzmeyer, Richfield; Ann M. Crespi, Minneapolis; William G. Howard, Roseville; Paul M. Skarstad, Plymouth, all of Minn.

[73] Assignee: Medtronic, Inc., Minneapolis, Minn.

[21] Appl. No.: 840,224

[22] Filed: Feb. 24, 1992

[51] Int. Cl.$^5$ .............................................. H01M 6/14
[52] U.S. Cl. ...................................... 429/90; 429/194; 429/218
[58] Field of Search .................... 429/90, 91, 194, 196, 429/197, 218

[56] References Cited

U.S. PATENT DOCUMENTS

| | | | |
|---|---|---|---|
| 3,757,793 | 9/1973 | Fester et al. | 128/419 |
| 4,190,706 | 2/1980 | Rao et al. | 429/191 |
| 4,228,226 | 10/1980 | Christian et al. | 429/194 |
| 4,259,415 | 3/1982 | Tamura et al. | 429/90 |
| 4,327,166 | 4/1982 | Leger | 429/194 |
| 4,619,874 | 10/1986 | Skarstad et al. | 429/91 |
| 4,772,457 | 9/1988 | Pauster et al. | 429/218 X |
| 4,786,499 | 11/1988 | Slane et al. | 429/197 |
| 4,803,137 | 2/1989 | Miyazaki et al. | 429/194 |
| 4,874,680 | 10/1989 | Koshiba et al. | 429/197 |
| 4,925,751 | 5/1990 | Shackle et al. | 429/218 X |
| 4,925,753 | 5/1990 | Schlaikjer | 429/196 |
| 4,971,868 | 11/1990 | Tucholski et al. | 429/174 |
| 4,977,046 | 12/1990 | Bleszinski et al. | 429/194 |
| 5,030,528 | 7/1991 | Shen et al. | 429/197 |
| 5,079,109 | 1/1992 | Takami et al. | 429/197 |

Primary Examiner—Anthony Skapars
Attorney, Agent, or Firm—Daniel W. Latham; Harold R. Patton

[57] ABSTRACT

Non-aqueous cells employing an anode, such as lithium, a liquid organic electrolyte and a cathode comprising manganese dioxide ($MnO_2$), carbon monofluoride ($CF_x$) or mixtures of the two and an additive selected from the group consisting of vanadium oxide ($V_6O_{13+y}$), silver vanadate ($\beta Ag_xV_2O_5$, $\delta Ag_xV_2O_5$ or $Ag_2V_4O_{11}$), bismuth flouride ($BiF_3$) and titanium sulfide ($TiS_2$) as an end-of-service (EOS) indicator.

11 Claims, 4 Drawing Sheets

ELECTROCHEMICAL CELLS WITH END-OF-SERVICE INDICATOR

BACKGROUND OF THE INVENTION

The latest generation of medical devices have demanding power requirements such as high rate requirements. Power sources (electrochemical cells, cells or batteries hereinafter) used heretofore for medical applications and other applications have included, for example, cathodes of $MnO_2$. Such cells have been satisfactory and have exhibited gradually decreasing voltage curves in low rate applications. When utilized in high rate applications the gradual discharge ramp is lost and becomes one in which cell service life ends precipitously with a sharp voltage drop off at end-of-service (EOS). This is unsatisfactory and some means is required for signaling the onset of cell depletion or EOS i.e., monitoring for remaining cell service life.

In general, composite electrodes of different potentials to warn of cell depletion are known in battery technology. For example, U.S. Pat. Nos. 3,757,793 to Doty and Fester; U.S. Pat. No. 4,619,874 to Hayes and Skarstad and U.S. Pat. No. 4,259,415 to Tamura et al relate to composite cathodes.

BRIEF DESCRIPTION OF THE DRAWINGS

FIG. 1—$Li/MnO_2 + V_6O_{13+y}$
FIG. 2—$Li/CF_x + V_6O_{13+y}$ Pulsed Discharge
FIG. 3—$Li/CF_x + Ag_2V_4O_{11}$ Pulsed Discharge
FIG. 4—$Li/MnO_2 + Ag_2V_4O_{11}$
FIG. 5—$Li/CF_x + BiF_3$
FIG. 6—$Li/MnO_2$ Pulsed Discharge
FIG. 7—$Li/CF_x$ Pulsed Discharge
FIG. 8—$Li/V_6O_{13+y}$ Pulsed Discharge

SUMMARY OF THE INVENTION

Figure 1:
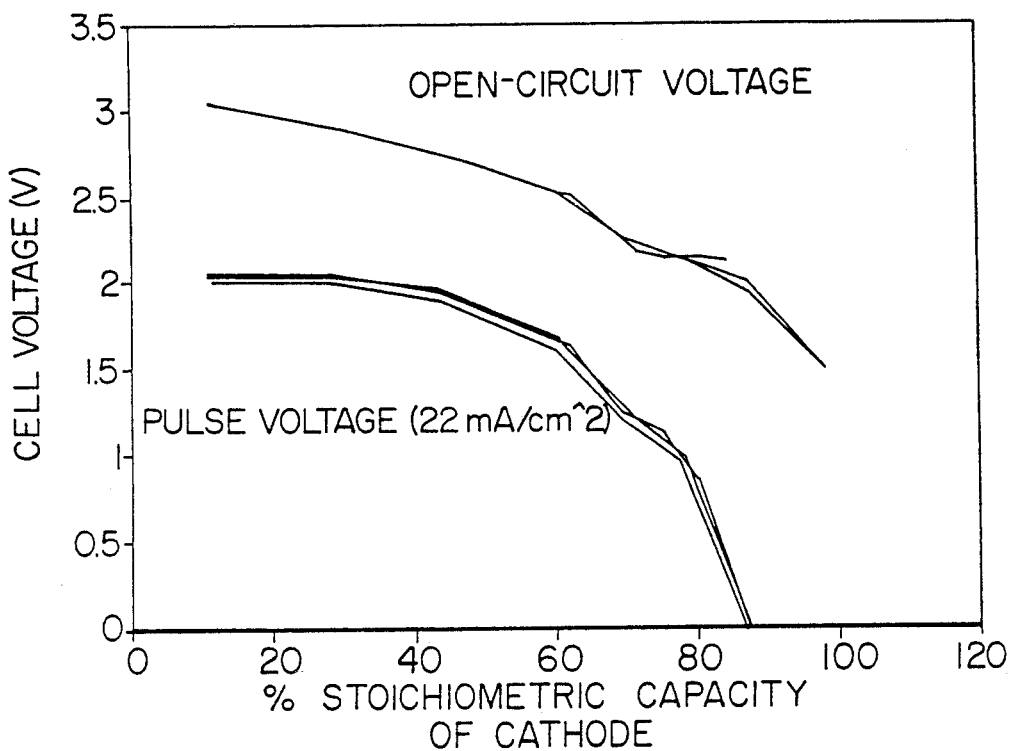
FIGS. 1-5 are graphs showing the EOS characteristics of cells according to this invention.

This invention relates to non-aqueous cells employing an active metal anode such as lithium, a liquid organic electrolyte and a cathode comprised of manganese dioxide and/or carbon monofluoride for use in high rate applications in which the cathode also contains an amount of a material selected from the group consisting of vanadium oxide ($V_6O_{13+y}$), the silver vanadates $\beta Ag_xV_2O_5$, $\delta Ag_xV_2O_5$ & $Ag_2V_4O_{11}$, bismuth fluoride ($BiF_2$) and/or titanium sulfide ($TiS_2$) as an end-of-service (EOS) indicator. Such cathodes are termed herein "composite cathodes" and provide an EOS function signaling the onset of cell energy depletion in the form of a reduced voltage signal from the cell.

DESCRIPTION OF PREFERRED EMBODIMENTS

Cells of the general $Li/MnO_2$ or $Li/CF_x$ type are known in the art and are described more fully in, for example, U.S. Pat. No. 4,327,166 and U.S. Pat. No. 4,259,415, the contents of which are incorporated herein by reference. Briefly, such cells may make use of an anode of lithium, potassium, sodium, calcium, magnesium, aluminum, and alloys thereof (referred to herein as active metals generally). Such cells may make use of a cathode of manganese dioxide ($MnO_2$), carbon monofluoride ($CF_x$), or mixtures thereof. Such cells may make use of an electrolyte of an ionizing solute dissolved in organic solvent. For example, the particular cells described herein preferably utilize a 1 M $LiClO_4$, 50/50 propylene carbonate/diglyme or glyme (by volume) electrolyte, that has a water content of less than about 50 ppm (even up to 100 ppm may be acceptable in some circumstances).

In accordance with this invention, relative to the type of cells already known and described above, it has been discovered that mixing a minor amount of the secondary cathode material: $Ag_2V_4O_{11}$, $\delta Ag_xV_2O_5$, $\beta Ag_xV_2O_5$, $V_6O_{13+y}$, $BiF_3$ or $TiS_2$ in any ratio with the selected primary cathode material ($MnO_2$ and/or $CF_x$) extends time in a voltage interval near EOS i.e., capacity in a voltage interval near EOS. These additives provide a sloping voltage ramp of lower voltage than the $MnO_2$ and/or $CF_x$ primary cathode material alone. Any of the additives can be mixed with the primary cathode material over the entire composition range to provide the combination of properties desired i.e., to provide a fraction of dischargeable capacity within a specified voltage interval.

In one preferred form of the invention, a cell is provided having a lithium anode, a cathode of $MnO_2$ and one of the following compounds in minor amount: $Ag_2V_4O_{11}$, $\delta Ag_xV_2O_5$, $\beta Ag_xV_2O_5$ or $V_6O_{13+y}$ as active components, a conductive component of carbon or graphite and a binder component such as PTFE. The latter two components are used to enhance performance of the battery. Carbon and or graphite increase conduction of the cathode and enhance rate capability. The binder holds the 5 cathode together. The cell contains an electrolyte such as 50/50 diglyme/propylene carbonate 1M in $LiClO_4$ or other organic electrolyte capable of transporting lithium ions. The cell also contains suitable current collectors, preferably but not necessarily embedded in the electrodes, suitable separators e.g., microporous polyethylene or polypropylene and/or a layer of non-woven polypropylene or polyethylene laminated to it and a suitable case, preferably a hermetically sealed case of metal, preferably stainless steel and preferably sealed by welding. Feedthroughs of corrosion-resistant glass are typically used when the cell is sealed, as is known in the art, for electrical contact. Another preferred form of the invention is a similar cell to that described above except a carbon monofluoride ($CF_x$), cathode is used with any of the aforementioned cathode additives in a 2:1 stoichiometric capacity ratio of $CF_x$, to additive. Other ratios of $CF_x$, to additive such as the stoichiometric ratios of 3:1, 4:1, 1:1 for example may be used as well.

EXAMPLES

Cells having a lithium anode, an electrolyte of 1M Li $ClO_4$, 50/50 propylene carbonate/diglyme (by volume) and water content of 15-44 ppm were prepared with composite cathodes.

A. $V_6O_{13+y} + MnO_2$
B. $V_6O_{13+y} + CF_x$
C. $Ag_2V_4O_{11} + CF_x$
D. $Ag_2V_4O_{11} + MnO_2$
E. $BiF_3 + CF_x$

Figure 6:
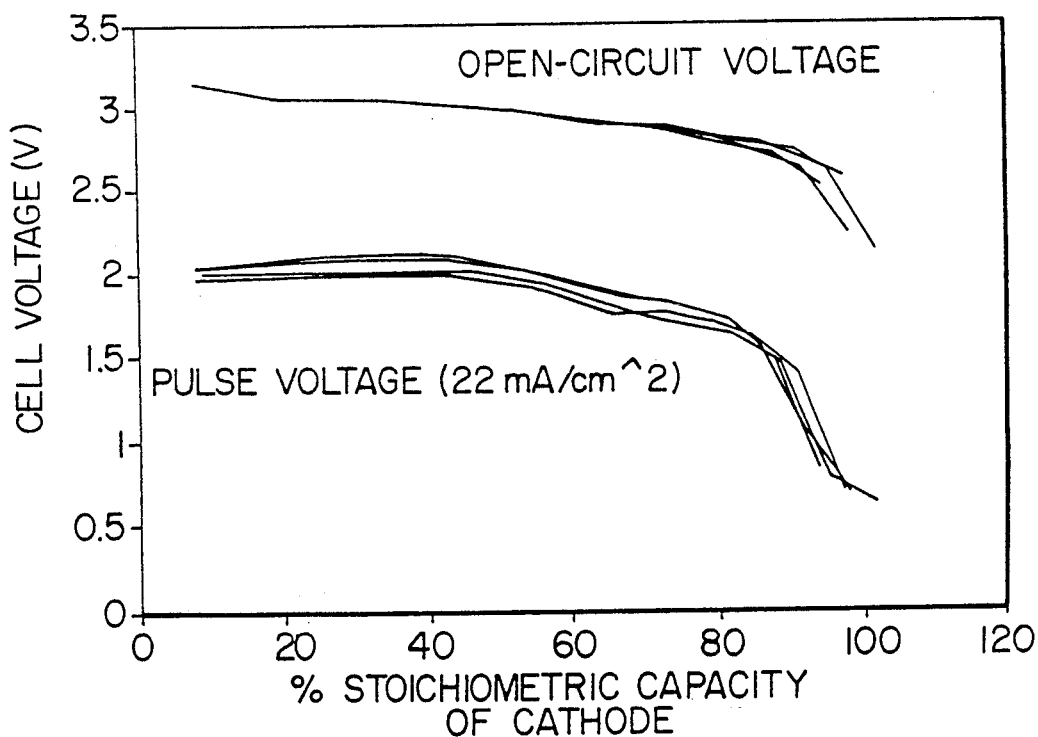
FIGS. 6, 7 and 8 are similar curves for comparison purposes.
Figure 7:
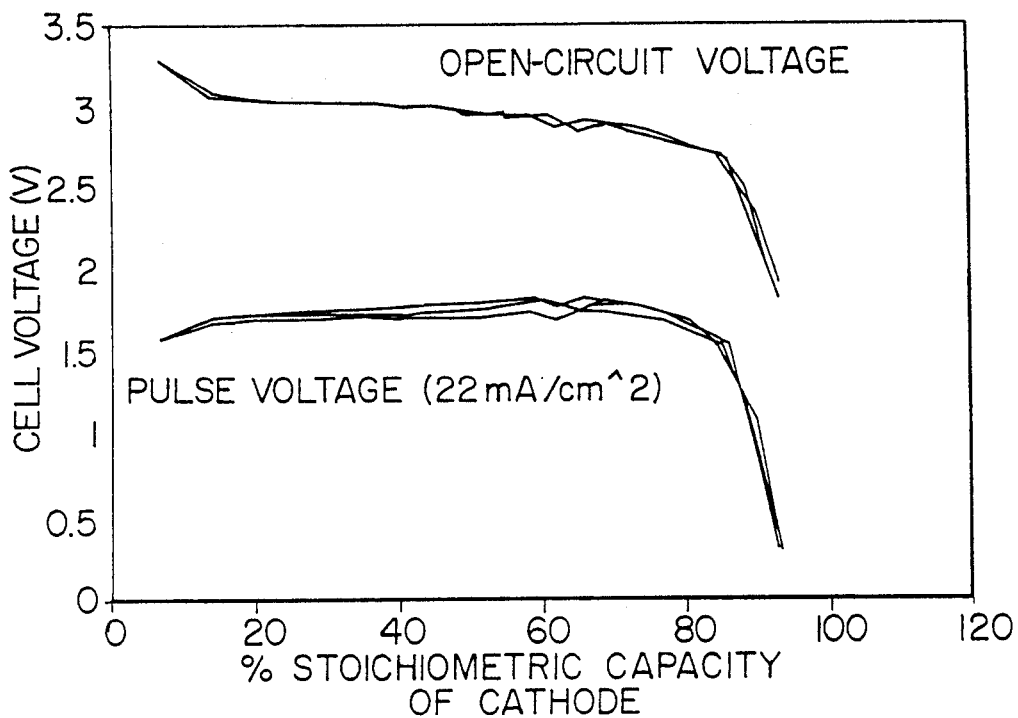

All of the cathodes included 5% by weight PTFE, 3% by weight carbon black and 3% by weight graphite. Pulsed discharge curves for A-E are shown in FIGS. 1-5. Comparison discharge curves with only the primary cathode materials are shown in FIGS. 6 and 7.

Similar cells were also built and tested with an electrolyte of 1M LiBF$_4$ in gamma-butyrolactone with similar results.

Preferred composite cathode compositions have stoichiometric ratios of:

2:1 CF$_x$:V$_2$O$_5$
2:1 CF$_x$:V$_6$O$_{13+y}$
4:1 CF$_x$:V$_2$O$_5$
4:1 CF$_x$:V$_6$O$_{13+y}$ (Ratios are expressed in terms of the relative stoichiometric capacities provided by the ingredients.)

Background information regarding CF$_x$ may be found in "Graphite Fluorides and Carbon-Fluoride Compounds", T. Nakajima and N. Watanabe, CRC Press, 1991.

An additional feature of the invention lies in the discovery that V$_6$O$_{13+y}$ as the secondary cathode material suppresses corrosion in sealed Li/CF$_x$ cells as compared to the other embodiments described hereinabove, when the electrolyte is gamma-butyrolactone containing 1 molar of LiBF$_4$. This represents a special preferred embodiment of the invention.

Figure 2:
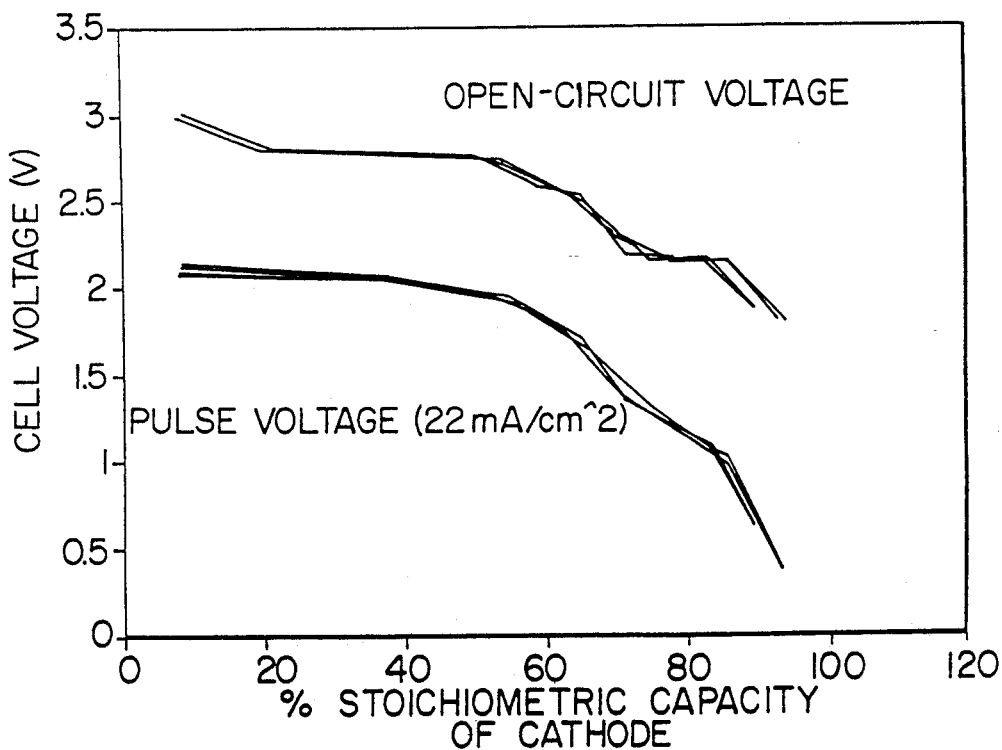
Figure 3:
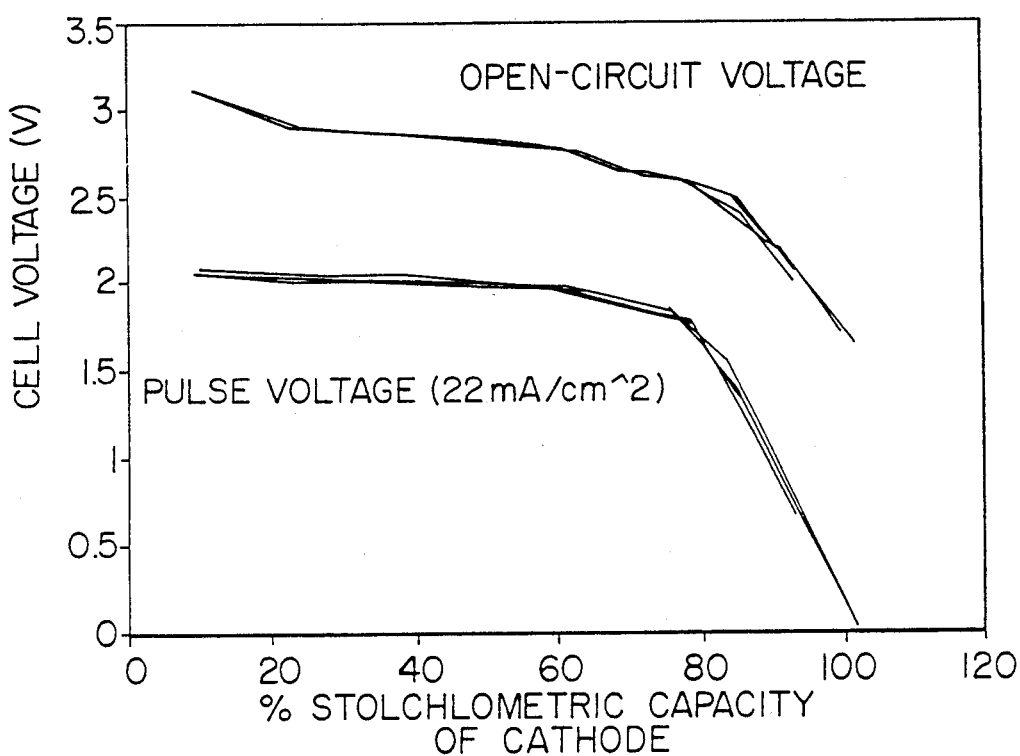
Figure 4:
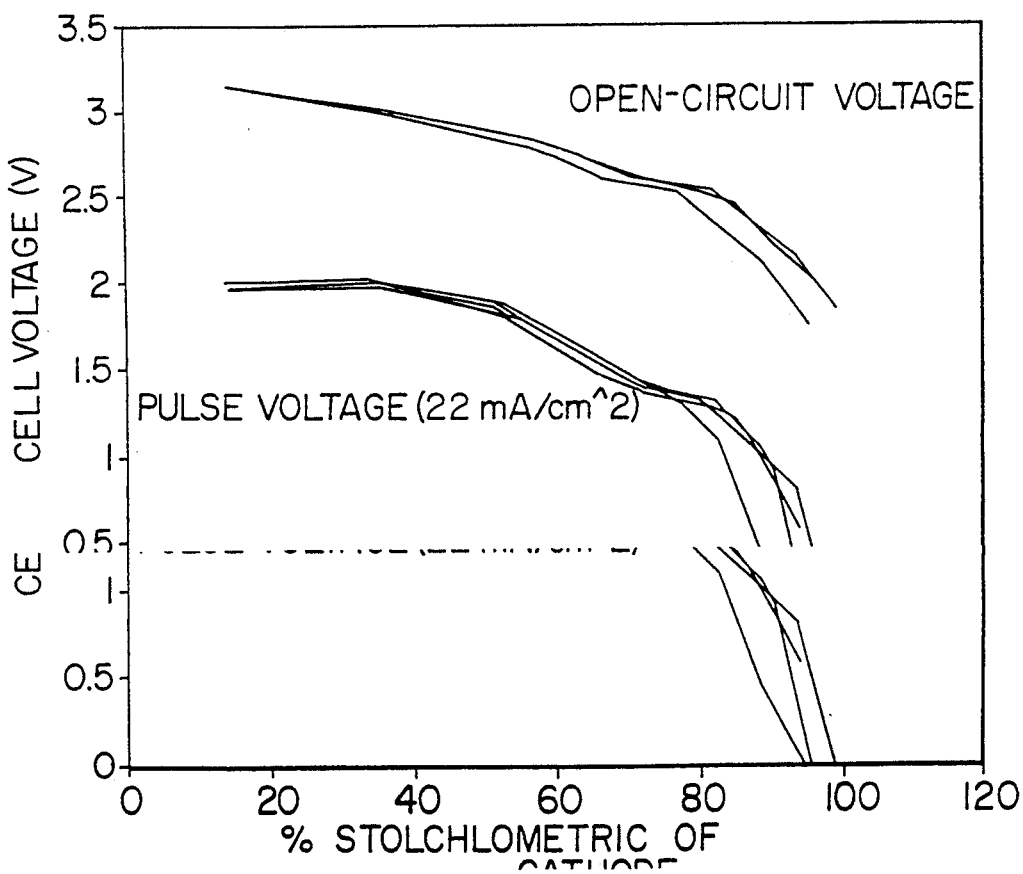
Figure 5:
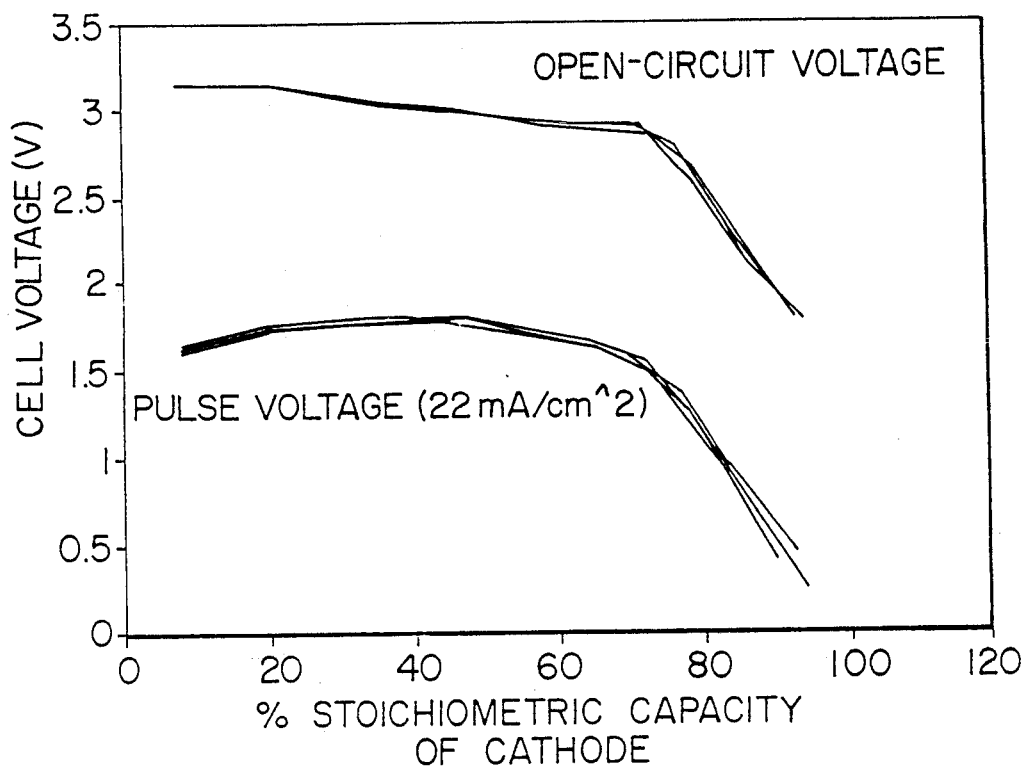
Figure 8:
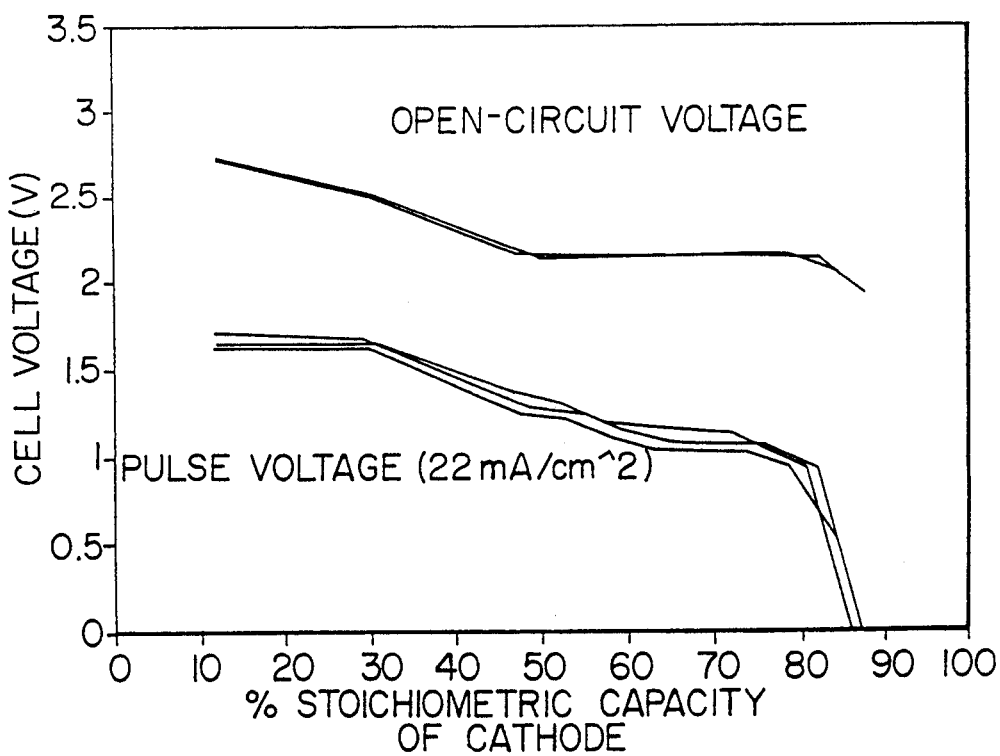

Another special preferred embodiment of the invention is found in the combination of CF$_x$+V$_6$O$_{13+y}$ cathode material as it provides a higher pulse voltage than either CF$_x$ or V$_6$O$_{13+y}$ alone as can be clearly seen in comparing FIG. 2 with FIG. 7 and FIG. 8.

This completes the description of the preferred and alternate embodiments of the invention. Those skilled in the art may recognize other equivalents to the specific embodiment described herein which equivalents are intended to be encompassed by the claims attached hereto.

We claim:

1. A non-aqueous cell comprising:
   (a) an active metal anode;
   (b) a liquid organic electrolyte; and
   (c) a composite cathode, the composite cathode comprising a mixture of a first material selected from the group consisting of manganese dioxide, carbon monofluoride and mixtures thereof and a second material selected from the group consisting of V$_6$O$_{13+y}$, $\beta$Ag$_x$V$_2$O$_5$, $\delta$Ag$_x$V$_2$O$_5$, Ag$_2$V$_4$O$_{11}$, BiF$_3$ and TiS$_2$.

2. The cell of claim 1 wherein the active metal anode is lithium.

3. The cell of claim 1 wherein the cathode mixture comprises CF$_x$ and V$_6$O$_{13+y}$.

4. The cell of claim 1 further comprising a conductivity enhancer and a binder in the cathode mixture.

5. The cell of claim 4 wherein the conductivity enhancer is a conductive carbon.

6. The cell of claim 1 wherein the cathode mixture has a ratio of the first component to the second component (expressed in terms of stoichiometric capacity) of about 2:1.

7. The cell of claim 1 wherein the cathode mixture has a ratio of the first component to the second component (expressed in terms of stoichiometric capacity) of about 4:1.

8. A cell exhibiting suppressed internal corrosion comprising:
   (a) a lithium metal anode;
   (b) a liquid organic electrolyte which includes gammabutyrolactone and LiBF$_4$; and
   (c) a cathode material which includes V$_6$O$_{13+y}$.

9. A cell exhibiting improved pulse voltage comprising:
   (a) an active metal anode;
   (b) a liquid organic electrolyte; and
   (c) a cathode comprised of CF$_x$ and V$_6$O$_{13+y}$.

10. The cell of claim 9 in which the anode is lithium.

11. The cell of claim 9 in which the CF$_x$ and V$_6$O$_{13+y}$ are present in a ratio of about 2:1 (expressed in terms of stoichiometric capacity).

* * * * *